No. 705,435. Patented July 22, 1902.
J. S. PATTEN.
DUST GUARD.
(Application filed Dec. 26, 1901.)
(No Model.)

WITNESSES:
Jos. A. Ryan
Perry B. Turpin

INVENTOR
James S. Patten
BY Munn & Co.
ATTORNEYS

UNITED STATES PATENT OFFICE.

JAMES S. PATTEN, OF BALTIMORE, MARYLAND, ASSIGNOR TO METAL DUST GUARD COMPANY OF BALTIMORE CITY, A CORPORATION.

DUST-GUARD.

SPECIFICATION forming part of Letters Patent No. 705,435, dated July 22, 1902.

Application filed December 26, 1901. Serial No. 87,274. (No model.)

*To all whom it may concern:*

Be it known that I, JAMES S. PATTEN, a citizen of the United States, residing at Baltimore, in the State of Maryland, have made certain new and useful Improvements in Dust-Guards, of which the following is a specification.

This invention is an improvement in dust-guards for use in car-axle boxes, and has for an object to provide a novel simple construction which can be cheaply made, will fit in any ordinary car-axle box, and will be durable and efficient in use; and the invention consists in certain novel constructions and combinations of parts, as will be hereinafter described and claimed.

Figure 1:
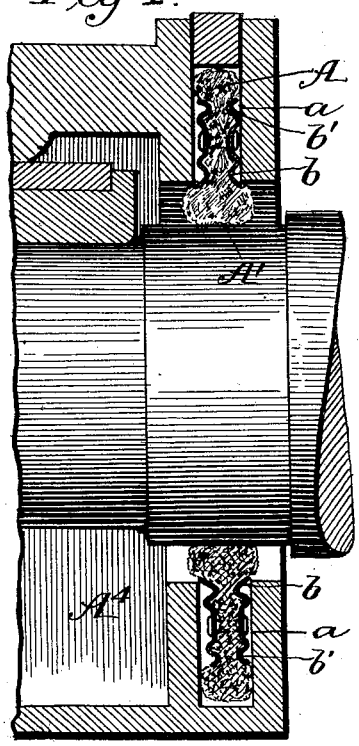
Figure 2:
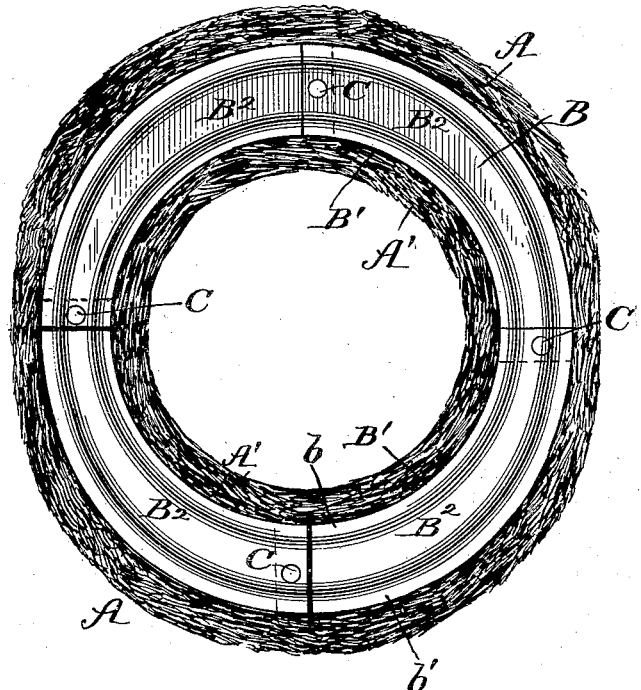

In the drawings, Figure 1 is a longitudinal section, partly broken away, showing a portion of a car-axle box with the axle therein and the improved dust-guard applied. Fig. 2 is a face view of the dust-guard, and Fig. 3 is a detail perspective view of one of the sections of the frame or brace plate.

In carrying out my invention I employ a ring-like packing-section A, which may be of felt or other suitable material, and a ring-like frame or brace applied to the face of such packing-section and preferably to both faces thereof, as shown in Fig. 1. The packing-section A is elongated, as shown in Fig. 2, so when fitted in the recess $a$ of the car-axle box $A^4$ the guard will be held from turning. To this end the ring-like packing A may be slightly oval on its outer side, as shown, it having a circular opening A', as shown in Fig. 2. The brace-frame B is preferably made, as shown in Fig. 2, to partake on its outer side of the general external outline of the packing A, being thus made oval externally, as shown, with its major axis vertically or in aline with the major axis of the packing A and with a central circular opening B', concentric with the opening A' in the frame A. From Figs. 1 and 3 it will be noticed that the inner and outer edges of the ring-like frame-plates B are returned or bent outward at $b$ and $b'$, forming rounded surfaces to press into the packing, thus avoiding any injury to the packing and enabling me to clamp the opposite brace-frames so firmly together as to operate by compression on the packing to prevent the oil from passing outward to the outer edge of the packing A, as will be understood from Fig. 1. In securing this outward turning of the edges of the packing brace-plate it is preferred to corrugate the brace-plate longitudinally, as will be understood from Fig. 3, as thereby I secure a maximum strength with the given amount and weight of metal and am also able to provide channels in which are produced the openings $b^2$ for the rivets C. It will be noticed that the flange $b$ at the inner edge of the frame B is flared outwardly, so that the opposite flanges $b$ (see Fig. 1) form an outwardly-tapering recess in which the inner edge of the packing-ring is seated and which will operate to prevent any injury to such packing in applying the guard to an axle.

Figure 3:
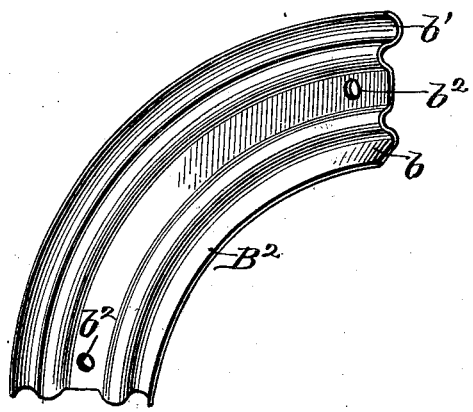

A special feature of my invention consists in forming the brace-frames B of a series of segmental sections $B^2$, such as shown in Fig. 3, and which when fitted end to end and united form the ring-like brace-plate B, as shown in Fig. 2, the ends of the adjoining plates or sections overlapping, as will be understood from Fig. 2, and the rivets C operating to unite the overlapping ends of the adjacent sections as well as to unite the opposite braces B, as will be understood from Fig. 1.

By making the frame B of the segmental sections I am able to produce the said frames at a minimum cost by cutting the sections, such as shown in Fig. 3, from a plate of metal and subsequently corrugating them into the form shown in said figure. Also by fitting the lapped ends of the sections together and uniting them by the rivets, which also draw the sections of the brace firmly into contact with the packing, I secure a firm bracing of the packing-section, and when the brace-frames are provided on both faces of the packing-section, as is preferred, the braces and packing will be united into a practically rigid structure, as will be understood from Figs. 1 and 2.

The sections $B^2$, it will be seen from Figs. 2 and 3, are made wider at one end than at the other and are united with the small end of one section adjoining the small end of the next and with the wide ends united, thus forming the frame oval on its outer edge and having the circular opening, as before described.

Having thus described my invention, what I claim as new, and desire to secure by Letters Patent, is—

1. The improved dust-guard herein described, consisting of the packing-section having a circular opening, and the brace applied to the face of said section between the inner and outer edges thereof and having the central circular opening, and composed of segmental sections each made wider at one end than at the other and united together at their meeting ends with wide end to wide end and narrow end to narrow end, substantially as set forth.

2. The dust-guard herein described, comprising the packing-section and the frame or brace applied to the face thereof and composed of segmental sections connected to form a ring-like brace, substantially as set forth.

3. A dust-guard comprising a packing-section and a ring-like brace applied to the face of said section and composed of segmental sections overlapped at their ends and united together and to the packing-section, and corrugated longitudinally and provided at their inner and outer edges with portions projecting into the packing-section, whereby to compress the same, substantially as set forth.

4. A dust-guard comprising the packing-section, a brace applied to the face thereof and composed of segmental sections overlapping each other at their ends, and the rivets passing through said overlapping ends and through the packing-section, substantially as set forth.

5. A dust-guard having a packing-section and the brace applied to the face of said packing-section and composed of segmental sections corrugated longitudinally and united at their ends, substantially as set forth.

6. A dust-guard comprising a ring-like packing-section and the brace applied to the face of the packing-section and provided at its edge with an inwardly-curving portion by which to compress the packing-section, substantially as set forth.

7. A dust-guard comprising a ring-like packing-section, and ring-like brace-frame applied to the opposite faces thereof and having flaring flanges or wings at their inner ends forming tapering recesses for the inner edges of the packing, substantially as set forth.

8. A dust-guard composed of the packing-section, and the ring-like brace or frame applied to the faces of the packing-section and composed of sections united together at their ends and made wider at one end than at the other and corrugated longitudinally, substantially as set forth.

JAMES S. PATTEN.

Witnesses:
MORTON SCHAEFFER,
CURBY S. HURLEY.